June 4, 1935. W. C. GROFF ET AL 2,003,435
PROTECTING DEVICE FOR AUTOMOBILE UPHOLSTERY
Filed Dec. 18, 1933
FIG. 1.
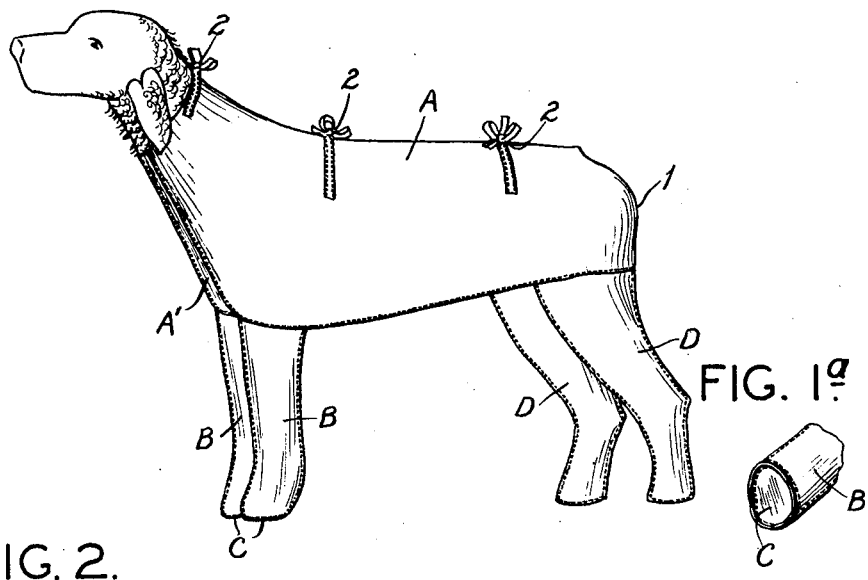
FIG. 1ª
FIG. 2.
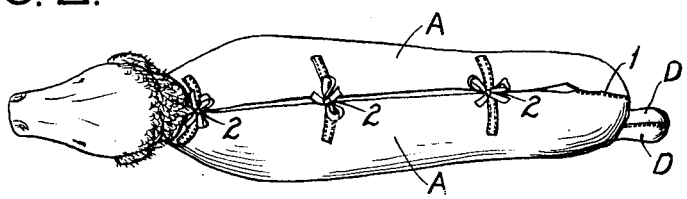
FIG. 3.
FIG. 4.
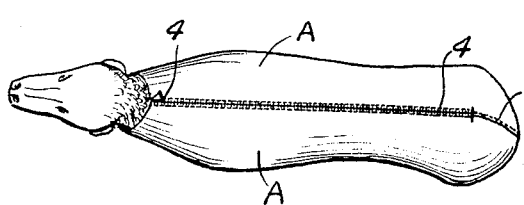
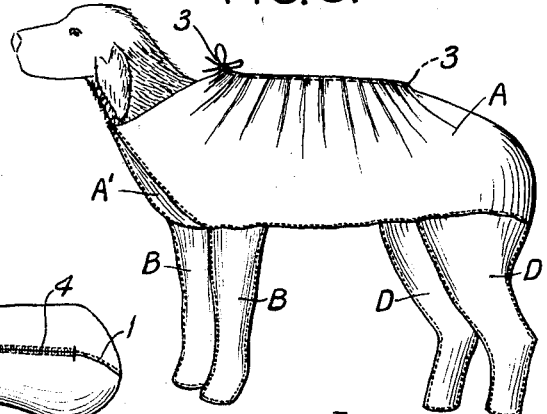
INVENTORS
WILLIAM C. GROFF
WALTER C. SIEBENS
BY Bakewell & Church
ATTORNEYS Patented June 4, 1935

2,003,435

UNITED STATES PATENT OFFICE 2,003,435

PROTECTING DEVICE FOR AUTOMOBILE UPHOLSTERY

William C. Groff and Walter C. Siebens, St. Louis, Mo.

Application December 18, 1933, Serial No. 702,874

1 Claim. (Cl. 54—79)

This invention relates to a device for protecting the interior of an automobile from injury when a dog is being transported in the automobile.

The main object of our invention is to provide an inexpensive device that makes it possible to transport a dog in an automobile without danger of the upholstery, rug or interior finish of the automobile becoming scratched, covered with hair or otherwise injured by the dog.

Another object is to provide a device of the kind referred to, that takes up practically no space when it is not in use, and which is of such design that it can be quickly put into service.

And still another object is to provide an automobile upholstery protecting device of the kind previously described, which, in addition to making it possible to transport a wet hunting dog covered with mud and burrs, without danger of injuring the interior of the automobile, also affords protection to the dog and reduces the liability of the dog catching cold, as often occurs when a wet hunting dog is subjected to an automobile trip of several hours duration.

The automobile upholstery protecting device herein described was devised principally for the use of hunters who reside in cities and who use their automobiles to transport themselves and their dogs to and from hunting grounds, and it has effectively eliminated the main thing that invariably mars the end of a city hunter's perfect day, i. e., the discord that results when the family automobile is returned with the upholstery and rug covered with spots of mud and water, hair and burrs, and the highly polished interior finish scratched and marred beyond repair. It may be used for other purposes, however, to protect the furniture and interior finishings of a home from a dog whose hair is shedding or whose claws are sharp. In comparison with a dog trunk that is adapted to be attached to the running board of an automobile, our device has the advantages of being capable of being manufactured and sold at a fraction of the cost of a trunk; it takes up practically no space when it is not in use, and it can be stored in an automobile seat compartment where it is always in readiness for instant use.

Figure 1 of the drawing is a perspective view, illustrating our improved protecting device arranged in operative position on a dog.

Figure 1a is a fragmentary perspective view of one of the fore leg casings.

Figure 2 is a top plan view of Figure 1.

Figure 3 is a perspective view, illustrating another form of our invention; and

Figure 4 is a top plan view, illustrating still another form of our invention.

Briefly described, our improved protecting device consists of a housing structure made of fabric or any other suitable flexible or pliable material, and constructed or designed so that it can be applied to a dog so as to cover preferably all portions of the dog except the dog's head. Usually, the device will consist of a body portion that covers the back, sides, belly and haunches of the dog, two fore leg casings attached to said body portion and closed at their lower ends, and two hind leg casings attached to said body portion and closed at their lower ends. In some part of said body portion, preferably at the top side of same, is a slit or opening through which the dog may be introduced into the device. Various means may be used to close the slit or opening in the body portion, such as tying tapes, buttons and co-acting button holes, or fastening devices of the kind commonly referred to as glove fasteners, or slide fastener fasteners. The particular shape and method of constructing the body portion and the leg casings is immaterial, and while said parts may be formed from various kinds of materials, we prefer to make said parts of water-proof fabric that is strong enough to successfully withstand the strains to which the device is subjected when in service and which is of a sufficiently tight weave to afford some protection and warmth to a wet hunting dog. In instances where the device is to be used on dogs other than hunting dogs, for example, on a house dog or a dog being taken on an automobile tour in the summer time, the device may be made of relatively light weight porous fabric.

In the preferred form of our invention herein illustrated the body portion of the device is made of three pieces of material or fabric joined together by stitched seams, to wit, two side pieces A corresponding in shape to the general outline of a dog's body, and a belly piece A' that is substantially wedge-shaped in general outline and attached to the lower edge portions of the side pieces A by stitched seams. The apex or reduced end of the belly piece A' runs forwardly from the point where the hind leg housings are attached to the body portion, and extends upwardly over the chest of the dog, as shown in Figure 1.

Two fore leg casings and two hind leg casings are attached to said body portion. Each fore leg casing is formed from two side pieces B of fabric whose longitudinal edges are joined together by stitched seams. The lower end of each of said leg casings is completely closed by a substantially disk-shaped bottom piece C to which the side pieces B are attached, the upper end of one of said side pieces being stitched to one of the side pieces A of the body portion and the other side piece of the leg casing having its upper end stitched to the belly piece A' of the body portion. The hind leg casings are of similar construction and each is made up of two side pieces D cut so as to conform approximately to the shape or outline of a dog's hind leg. The rear ends of the side pieces A of the body portion are joined together by a stitched seam 1, which extends upwardly and forwardly more or less, over the hind quarter portion of the dog, and the upper edges of the side pieces A of the body portion are not joined or connected together, thus producing a slit or opening in the top side of the body portion of the device through which the dog can be introduced into the device. Various means may be used to retain the device in operative position on the dog and close the opening or slit in the body portion through which the dog is introduced into the device. In the form of our invention shown in Figures 1 and 2 tying tapes 2 are attached to the side pieces A of the body portion in such a way that when they are intertwined and secured with a knot, they will draw the co-acting pieces of the body portion into fairly snug engagement with the dog's body and effectively hold the device in operative position on the dog. In the form of our invention shown in Figure 3, the side pieces A of the body portion are provided at their upper edges with a conventional drawstring 3 that is adapted to be tightened and secured with a knot so as to close up the opening in the body portion and hold the device in operative position on the dog. In Figure 4 we have illustrated the device as being equipped with a so-called slide fastener fastener 4 that is attached to the upper edge portions of the side pieces A of the body portion.

As previously stated, it is not essential that the body portion of the device be made of three pieces of fabric, or that the leg casings be provided with disk-shaped bottom pieces. The essential thing is that the device be constructed of flexible or pliable material that will conform approximately to the shape and not interfere with the movements of the dog's body and legs; that the device have portions which encase the dog's body, legs and feet; and that the body portion of the device be of such construction that the device may be easily applied to the dog or the dog introduced into the device.

Having thus described our invention, what we claim as new and desire to secure by Letters Patent is:

A protecting device for the purpose described, composed of a fabric body portion that conforms approximately to the general shape or outline of a dog's body, and leg and feet casings attached to said body portion, said body portion comprising two side pieces attached to a substantially wedge-shaped belly piece, and each of said leg and feet casings being composed of two side pieces whose lower ends are attached to a substantially disk-shaped end piece, and whose upper ends are attached respectively to the belly piece and to one of the side pieces of said body portion.

WILLIAM C. GROFF.
WALTER C. SIEBENS.